March 11, 1952 W. E. COPE 2,588,804
AUTOMATIC CLAY SPREADER
Filed Oct. 5, 1949 3 Sheets-Sheet 1
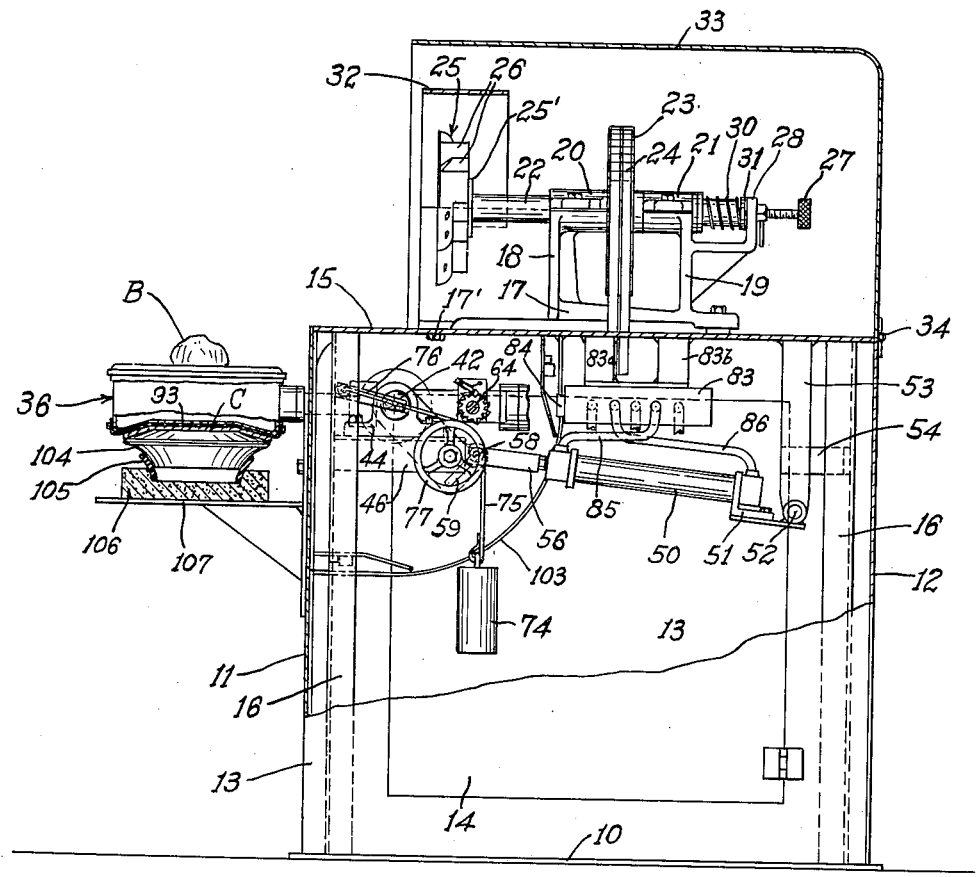
Fig.1
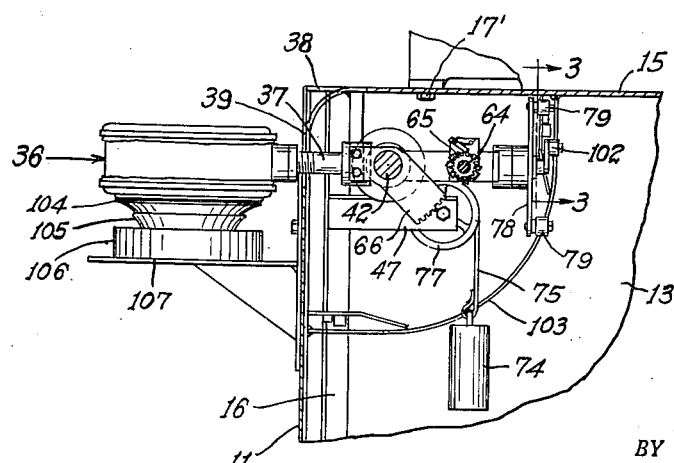
Fig.2
Fig.3
INVENTOR.
William E. Cope
BY
Frease and Bishop
ATTORNEYS INVENTOR.
William E. Cope
BY Frease and Bishop
ATTORNEYS March 11, 1952 — W. E. COPE — 2,588,804
AUTOMATIC CLAY SPREADER
Filed Oct. 5, 1949 — 3 Sheets-Sheet 3

INVENTOR.
William E. Cope
BY Frease and Bishop
ATTORNEYS

Patented Mar. 11, 1952

2,588,804

UNITED STATES PATENT OFFICE 2,588,804

AUTOMATIC CLAY SPREADER

William E. Cope, Sebring, Ohio, assignor to Frank M. Kinnard, Sebring, Ohio

Application October 5, 1949, Serial No. 119,663

9 Claims. (Cl. 25—24)

The invention relates generally to spreader machines used in pottery making for spreading out a ball of clay into a flat smooth disk and placing the disk on a mold where it is shaped to finished form by jiggering, in accordance with conventional practice, and more particularly to spreader machines of the type shown in U. S. Letters Patent No. 2,417,255, issued March 11, 1947, to Frank M. Kinnard.

The clay spreader disclosed in said patent includes a double-faced block mounted for swinging and rotary movement between the spreader tool and a mold, whereby after the spreader tool has spread out a ball of clay on one face into a flat disk, the operator swings and at the same time rotates the block to transfer the clay disk onto the mold, in which position he may place a ball of clay on the other face of the block and repeat the cycle of operation.

This cycle of operation obviously requires a considerable amount of skill on the part of the operator in order that the block is held at each end of the stroke for just the required time to complete each spreading and each transferring operation, and the result is that maximum efficiency is seldom if ever obtained. Moreover, the labor cost of the operation is increased because a skilled operator is required to manipulate the block during and between properly timed spreading and transferring operations.

It is an object of the present invention to provide an automatic spreading machine which will accurately time the spreading and transferring operations and swing and rotate the block between operations to present the faces of the block alternately to the spreader tool.

Another object is to provide a novel spreader machine which will automatically rotate the block through 180° as it swings from the spreader tool toward the mold.

Another object is to provide a novel spreader machine which will automatically prevent rotation of the block as it swings from the mold back to the spreader tool.

A further object is to provide an automatic spreader machine which rotates the block as it swings toward the mold and prevents rotation of the block as it swings back to the spreader tool, and which causes the block to pause momentarily at each end of the stroke.

Another object is to provide an automatic spreader machine in which the block has flexible faces of resilient material with novel means for holding each face firm alternately as it engages the spreader tool and allowing it to flex as it engages the mold.

A still further object is to provide an automatic spreading machine in which the block has faces of resilient material, each backed up by a set of flexible overlapping plates, and means automatically supporting said sets of overlapping plates alternately as the adjacent face engages the spreader tool.

These and other objects are accomplished by the parts, constructions, combinations and subcombinations comprising the present invention, a preferred embodiment of which is shown in the accompanying drawings and described in detail in the following specification as exemplifying the best known mode of carrying out the invention, the invention being set forth in general terms in the following general statement, and the scope of the invention being defined in the appended claims.

In general terms, the automatic spreader machine comprising the present invention includes a rotatable spreader tool mounted on top of the machine and a double-faced block mounted on a transverse shaft for swinging from a working position at the spreader tool downwardly over a mold supported in front of the machine, there being piston and cylinder means for oscillating the shaft to swing the block and ratchet and gear means carried by the block for automatically rotating it through one-half revolution as it swings downwardly, and valve means operated by said shaft for reversing the piston at each end of its stroke.

Referring to the drawings forming part hereof, in which a preferred embodiment of the invention is shown by way of example:

Figure 1 is a side elevation, partly in section, of the novel machine;

Fig. 2 is a fragmentary sectional view as on line 2—2, Fig. 6, with the parts in the position of Fig. 1;

Fig. 3 is an enlarged fragmentary sectional view as on line 3—3, Fig. 2;

Similar numerals refer to similar parts throughout the drawings.

Figure 4:
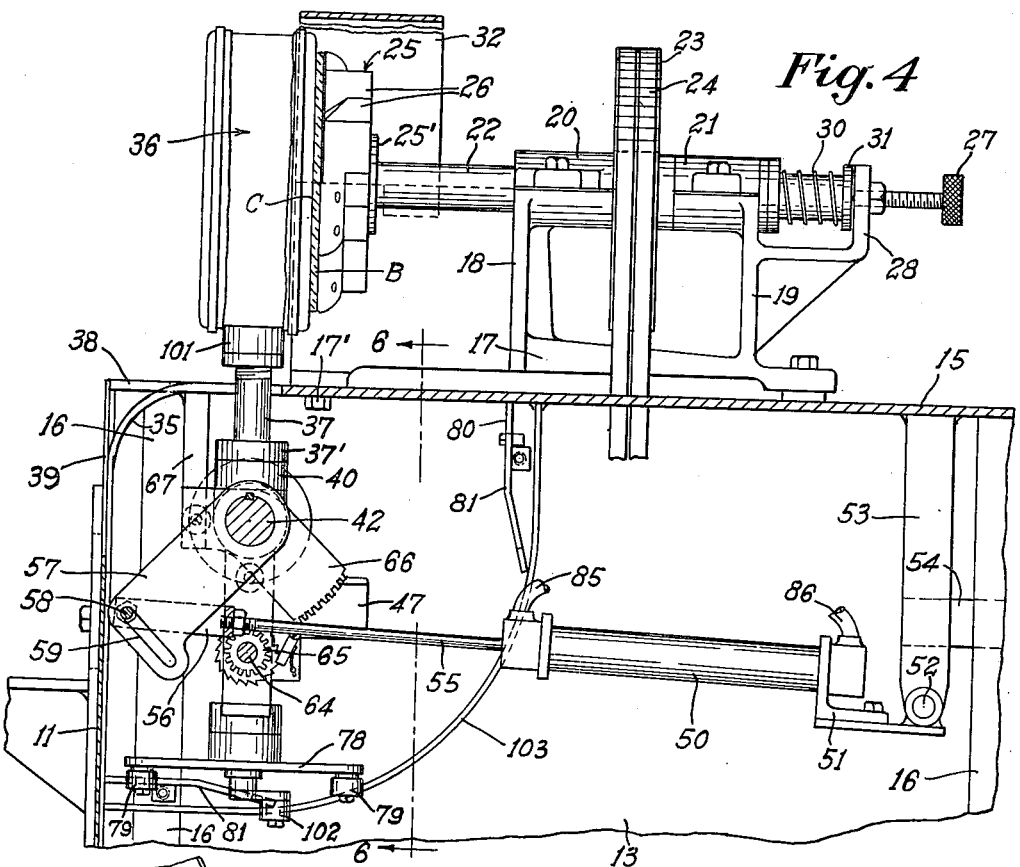
Fig. 4 is an enlarged fragmentary sectional view showing the block in its upright position.

Referring to Fig. 1, the machine preferably includes a housing supported upon a base plate 10, the housing including a front wall 11, rear wall 12, and side walls 13 having access doors 14 hinged thereon. The top wall 15 of the housing is supported on the housing walls 11, 12 and 13, and on upright angles 16 located near the corners of the housing.

The base or bedplate 17 for the spreader tool is mounted on the top housing wall 15 by bolts 17' and has spaced uprights 18 and 19 upon the upper ends of which are located aligned shaft bearings 20 and 21 respectively. The spreader shaft 22 is journaled in the bearings 20 and 21 and has its ends projecting beyond said bearings.

A pulley 23 is fixed on the shaft 22 between the bearings 20 and 21, and this pulley is operatively connected by a belt 24 to a pulley on the shaft of a suitable driving motor (not shown) located within the housing of the machine.

A rotary spreader tool is fixed in a vertical plane upon the forward end of the shaft 22, and may be of the same construction as shown in U. S. Letters Patent No. 2,335,123, issued November 23, 1943, to Frank M. Kinnard. The spreader tool 25 generally includes a hub 25' fixed on the front end of the shaft 22 and provided with a plurality of radial blades 26 formed of suitable material in accordance with said Patent No. 2,335,123.

The spreader tool may be adjusted to produce varying thicknesses of clay bats, by means of an adjusting screw 27 threaded through an angular bracket 28 on upright 19 at the rear end of the shaft for adjusting the shaft longitudinally in the bearings 20 and 21, there being a coil spring 30 located around the shaft for urging a collar 31 thereon rearwardly against the adjusting screw. A substantially semi-cylindrical guard 32 may be located around the head of the spreader tool for preventing particles of clay from being thrown centrifugally outward therefrom, and a hood 33 may be provided covering the entire spreader tool and guard, said hood being preferably hinged at 34 to the top wall 15.

The spreader tool assembly and the driving means therefor are substantially the same as in the Kinnard Patent No. 2,417,255, and per se form no part of the present invention.

The double-faced block indicated generally at 36 swings from the position shown in Fig. 1, where it presses a bat of clay C over a mold, upwardly to the position of Fig. 4 where it forces a ball of clay B against the rotating spreader tool to smooth the same into a flat disk or bat, and on the down stroke the block 36 is rotated through 180° so as to position the flat disk of clay C over the mold. The block 36 is carried on a tubular shaft 37 which extends through a slot 38 in the top plate 15, when the block is in the upright position of Fig. 4, and through a connecting slot 39 in the front wall 11 when the block in is the position of Figs. 1 and 2. At each side of the slots 38 and 39, a portion of the corner of the housing is curved as indicated at 35 to permit rotation of the block 36.

Figure 6:
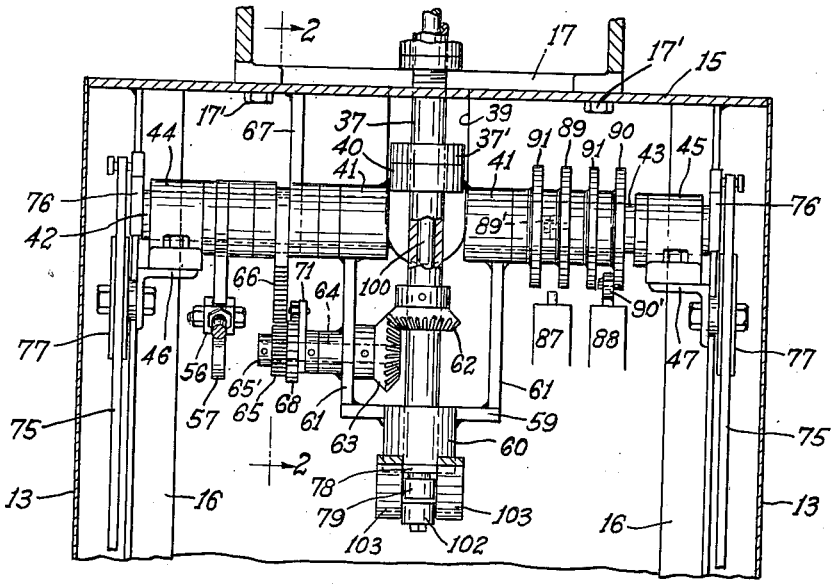
Fig. 6 is a fragmentary transverse sectional view as on line 6—6, Fig. 4.

Within the housing, the shaft 37 is journaled in a bearing 40, and a collar 37' on the shaft abuts the bearing. The bearing 40 is secured as by welding to two transversely-spaced collars 41 which are fixed on the inner ends of two aligned horizontal pivot shafts 42 and 43 supported within the housing. As best shown in Fig. 6, the shafts 42 and 43 are journaled at their outer ends in bearings 44 and 45 respectively, the bearings being supported on horizontal angles 46 and 47 respectively, secured to the upright angles 16. Accordingly, oscillation of the pivot shafts through 90°, will oscillate the bearing 40 and swing the block 36 between the positions of Fig. 1 and Fig. 4.

Oscillation of the pivot shafts is accomplished preferably by hydraulic or pressure fluid piston and cylinder means including a cylinder 50 supported at its rear end on a bracket 51 which is pivoted at 52 on a bar 53 depending from the cover plate 15 and secured by a brace 54 to the adjacent upright angle 16. The piston rod 55 which reciprocates within the cylinder 50 extends forwardly therefrom and has at its outer end a clevis 56 which straddles a lever arm 57 secured on the pivot shaft 42. A lost-motion connection is provided between the clevis 56 and the arm 57 including a pin 58 on the clevis which is slidable in a slot 59 in the arm.

Thus, when the piston rod 55 starts its return stroke from the position of Fig. 4, the pin 58 will travel to the rear end of the slot 59 before the arm 57 starts to rotate counterclockwise and the block 36 starts to swing forward and downwardly, and when the block reaches the position of Fig. 1, it will remain there momentarily until the pin 58 travels to the forward end of the slot on the forward stroke of the piston rod. In this manner, a momentary pause is obtained at each end of the stroke to give time for a ball of clay to be placed on the upper face of the block in the position of Fig. 1, and to give time for the spreader tool to smooth out the ball into a flat disk in the position of Fig. 4.

As shown in Fig. 6, the shaft 37 extends inwardly between the spaced ends of the pivot shafts 42 and 43 and the collars 41 thereon, and the inner end of the shaft is journaled in a bearing 60 which is mounted on a U-shaped bracket 59, the legs 61 of which are secured at their upper ends to the collars 41. Thus the bracket 59, collars 41 and bearings 40 and 60 constitute a frame in which the shaft 37 is swiveled. The means for rotating the block 36 through 180° on its downward stroke preferably includes a bevel gear 62 secured on the shaft 37 and meshing with a bevel gear 63 secured on a ratchet shaft 64 journaled in one of the bracket legs 61.

The outer end of the ratchet shaft has a pinion 65 journaled thereon, and the pinion is positioned by a retainer collar 65' to mesh with a gear segment arm 66 which is rotatable on the shaft 42 and held in a fixed position by the bracket arm 67 welded at its upper end to the cover plate 15. A ratchet gear 68 is secured to the pinion and is rotatable therewith on the ratchet shaft 64. A ratchet pawl 69 is held in engagement with the ratchet gear by a spring 70, and the pawl and spring are carried on an arm 71 which is pinned to the ratchet shaft 64.

Figure 7:
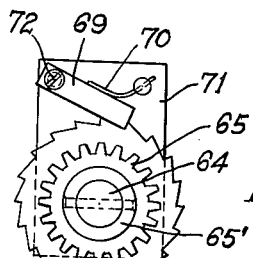
Fig. 7 is an enlarged end elevational view of the pinion and ratchet for rotating the block.

Referring to Fig. 7, when the pinion is rotated clockwise by engagement with the segment 66, the gear 68 will ratchet under the pawl 69, the pawl being moved upwardly on its pivot 72 against the spring 70. Thus, when the pinion 65 is rotated clockwise the shaft 64 will not be rotated. When the pinion is rotated in a counterclockwise direction by engagement with the segment 66, one of the ratchet teeth will engage the ratchet pawl 69 and rotate the arm 71 in a counterclockwise direction which will in turn rotate the shaft 64 which will through the bevel gears rotate the shaft 37, and the block 36 will be rotated by the shaft in the manner shown in Fig. 5. The number of teeth on the gear segment is such that the block 36 will rotate through 180° as the pinion 65 passes over the gear segment 66.

Figure 5:
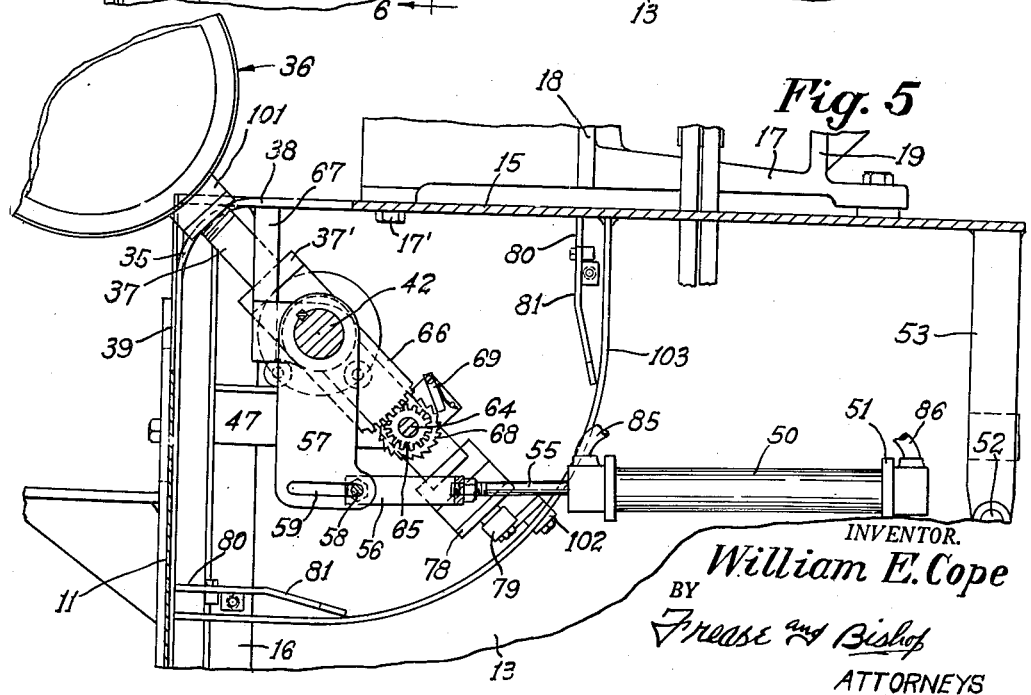
Fig. 5 is a similar view showing the block rotated through 90° at the middle of its downward stroke.

Referring to Figs. 4 and 5, as the block 36 is moved downwardly from the position of Fig. 4, when the pinion 65 meshes with the gear segment 66, the pinion will be rotated in a counterclockwise direction to turn the block through 180° during the downward stroke, so that the face of the block carrying the clay disk or bat C will be turned under when the block reaches the position of Fig. 1. As the block swings upwardly, the pinion 65 will on meshing with the gear segment rotate in a clockwise direction allowing the ratchet gear to turn without rotating the shaft 64, so that the block 36 will not be rotated during its upward stroke.

Counterweights 74 are attached one to the outer end of each shaft 42 and 43 for accelerating the last part of the stroke of the block 36 in each direction, so that the clay ball is quickly moved into engagement with the spreader at the top of the stroke, and the clay disk is quickly pressed into engagement with the top of the mold at the bottom of the stroke. The counterweights are each preferably attached by means of a belt 75 to a lever arm 76 on the end of each of the shafts 42 and 43, the belts being trained over pulleys 77 in such manner that the pull of the counterweight passes over center with respect to the shafts 42 and 43 near the end of each upward and downward stroke.

Means are provided for positively guiding the shaft 37 at the ends of each stroke of the head 36, to positively insure that the head is presented at right angles to the spreader and to the mold respectively. This means preferably includes a cross head 78 fixed on the end of the shaft 37 and having rollers 79 journaled at the ends of the crosshead arm, said rollers being adapted to enter between a pair of guides 80 at each end of the stroke. Each pair of guides 80 preferably has a pair of entrance jaws 81 yieldably mounted on the guides 80 by springs 82, so that as one of the rollers 79 enters the jaws 81, the shock and noise of the impact is dampened by the springs.

The means for controlling the flow of pressure fluid into and out of the cylinder 50 preferably includes a conventional sleeve-type valve 83 supported from the cover 15 by brackets 83a and 83b. The valve is operated in a usual fashion by a solenoid (not shown) actuating the plunger 84 of the valve to shift the flow of pressure fluid therethrough. A pressure fluid conduit 85 connects one end of the cylinder to the valve, and a pressure fluid conduit 86 connects the other end of the cylinder thereto. When the pressure fluid is flowing to the cylinder through the conduit 85 it is exhausting from the other end of the cylinder through the conduit 86, and vice versa. Suitable conduits connect the valve 83 with a pressure supply, which may be an oil reservoir within the bottom part of the housing in which the pressure is maintained by a suitable pump.

Referring to Fig. 6, the means for automatically controlling the solenoid which operates the valve 83 may consist of a pair of button switches indicated diagrammatically at 87 and 88 respectively. Cam collars 89 and 90 are fixed on the shaft 43 carrying cams 89' and 90' respectively for alternately actuating the button switches 87 and 88 at each end of the stroke of the block 36 to reverse the flow through the cylinder. Additional cam collars 91 may be provided on the shaft 43 for a purpose to be described.

Figure 8:
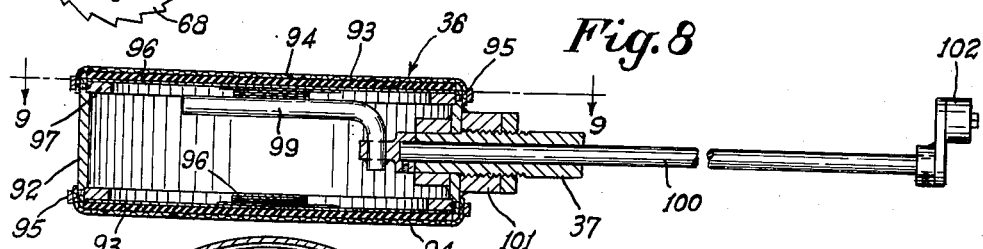
Fig. 8 is a detached fragmentary sectional view through the improved block.
Figure 9:
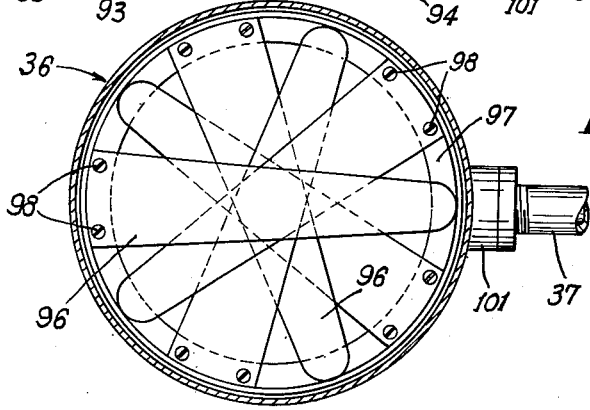
Fig. 9 is a fragmentary plan sectional view thereof, as on line 9—9, Fig. 8.

Referring to Figs. 8 and 9, the double-faced block indicated generally at 36 preferably includes a cylindrical wall 92 on both sides of which a thin rubber drumhead 93 covered with a layer of flannel 94 is mounted to provide opposite working faces, the flannel layers being held tightly stretched by means of rings 95 pressing the outer edges of the flannel against the wall 92. Each drumhead 93 is backed up by a plurality of thin metal strips 96 which overlap each other at the central portion of the drumhead, as shown, the strips being very thin, of the order of .02 inch in thickness so as to be extremely flexible. As shown in Fig. 9, the strips are supported at each end on rings 97 which rest on shoulders on the cylindrical wall 92, each strip being secured at one end to the ring by screws 98.

Means are provided alternately for holding the drumhead adjacent to the spreader in a flat substantially rigid condition, regardless of which drumhead is turned toward the spreader, and only while it is holding the clay against the rotating spreader for being flattened thereby. This means preferably includes an L-shaped arm 99 positioned within the drumhead and arranged to firmly support the same by engaging the overlapped portions of the back-up strips 96. The arm 99 is carried on the end of a shaft 100 which is rotatable axially within the tubular shaft 37, the shaft 37 being secured to the wall 92 of the block by being screwed into a nut 101 which is welded to the wall.

As shown in Figs. 4 and 6, the shaft 100 projects through the crosshead 78 on the inner end of shaft 37, and has an offset roller 102 on its inner end for rollably engaging between a pair of curved guides 103 secured at one end to the cover plate 15 and at the other end to the front wall 11 of the housing. During the entire stroke of the block 36 and the shaft 37, the roller 102 rides between the guides 103 so as to prevent the supporting arm 99 from turning, and when the block 36 rotates with the shaft 37 on the down stroke, the block rotates around the arm 99 so as to bring the drumhead 93 which is uppermost into engagement with the arm.

Thus, in the position of Fig. 1, the drumhead 93 on the underside is unsupported by the arm 99 so that it can readily shape the clay disk or bat C to conform to the upper surface of a mold 104 which may be supported in horizontal position within a heavy rubber ring 105 or the like located in a socket in a plaster base 106. The plaster base is shown as being supported on a bracket 107 on the front of the machine, but it will be understood that a series of bases 106 carrying molds 104 could be moved by a conveyor step by step so as to position a mold automatically under the block 36 in readiness to receive each successive clay bat C on the down stroke of the block.

Likewise, a ball of clay B may be placed manually on the top face of the block 36 each time it is in the position of Fig. 1, or balls of clay may be automatically placed successively on the block 36 by a suitable clay-feeding and cutting-off machine, if desired. In such case, suitable cams may be provided on the cam rings 91 on shaft 43 for automatically operating the mold-conveying and clay-feeding means at the proper time intervals.

In the operation of the improved machine, the motor driving the spreader shaft 22 is started to rotate the spreader tool, and the starting switch energizing the solenoid and pressure fluid pump is actuated. With the block 36 in the position of Fig. 1, and a ball of clay C deposited on the upper face, the pressure fluid will operate the piston to move the piston rod forwardly and rotate the shafts 42 and 43 through 90°, which swings the block 36 upwardly without rotating, to the position of Fig. 4, the roller 79 on the right entering between the guides 80 to line up the block 36 with its upper face parallel to the spreader.

As the clay is engaged by the rotating blades of the spreader, it is immediately flattened out to the disk or bat indicated at B, whereupon the flow through the cylinder 50 is reversed, and the piston rod 55 begins to move rearwardly. As the pin 58 attached to the rod moves through the slot 59 of the arm 57, the block 36 will not start to move until the pin reaches the rear end of the slot. As the head 36 then swings downwardly, the pinion 65 will engage the gear segment 66 and rotate the shaft 37 and block 36 through 180°, and as the block nears the end of its stroke the front roller 79 will enter between the lower guide bars 81 and come to a stop between the stationary parts 80 of the guides.

In this position the lower face of the block 36 will be accurately aligned with respect to the mold 104, and the pressure of the resilient drumhead 93 on the underside of the block will form the clay disk over the contour of the mold. The pause at the bottom of the stroke caused by the lost-motion connection between the piston rod and the arm 57 is sufficient for another ball of clay to be placed on the face, manually or mechanically, and when the block swings upwardly, the flannel covering 94 will release the drumhead from the clay disk, so that the mold with the clay disk thereon can be advanced to the jiggerman, and a new mold positioned in readiness to receive the block on the next downward stroke.

The improved automatic clay spreader machine provides for increased efficiency in operation with lower cost, because each cycle of operation is automatic and not dependent upon the skill of the operator. Moreover, greater uniformity in producing the smooth clay disk or bats is attained together with a saving in time.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

I claim:

1. A clay spreader machine including a rotating spreader tool, a mold, a pivoted frame, a block swiveled on said frame and having opposite working faces, pressure fluid means automatically oscillating said frame on its pivot, and ratchet gear means rotating the block as the frame moves in one direction to bring said working faces alternately into position adjacent the spreader tool and adjacent the mold.

2. A clay spreader machine including a vertical rotating spreader tool, a horizontal mold, a frame pivoted for swinging between said spreader tool and said mold, a block swiveled on said frame and having opposite working faces, pressure fluid means automatically swinging said frame, and ratchet and gear means automatically swiveling said block as it swings toward the mold to bring said working faces alternately into position adjacent the spreader tool and adjacent the mold.

3. In a clay spreader machine including a rotating spreader tool and a mold, a block having opposite flexible working faces, means automatically moving said block to bring said working faces alternately into position adjacent the spreader tool and adjacent the mold, and means in said block for alternately supporting said flexible working faces in substantially rigid condition as they are positioned adjacent the spreader tool.

4. In a clay spreader machine including a rotating spreader tool and a mold, a pivoted frame, a block swiveled on said frame and having opposite flexible working faces, means automatically oscillating said frame on its pivot, means rotating the block as the frame moves in one direction to bring said working faces alternately into position adjacent the spreader tool and adjacent the mold, and means positioned within said block for alternately supporting said flexible working faces in substantially rigid condition as they are positioned adjacent the spreader tool.

5. A clay spreader machine including a rotating spreader tool, a mold, a pivot shaft, a frame mounted on said shaft, a double-faced block swiveled on said frame, means oscillating said shaft and frame to position said block alternately adjacent to said spreader tool and adjacent to said mold, a ratchet shaft journaled in said frame and operatively connected to said block for rotating said block, a pinion and ratchet gear journaled on said ratchet shaft, and a fixed gear segment meshing with said pinion during a portion of the movement of said frame, said ratchet gear being arranged to rotate said block through 180° as the block swings downwardly toward the mold.

6. A clay spreader machine including a vertical rotating spreader tool, a stationary horizontal mold, a pivoted block having opposite working faces, power means oscillating said block on its pivot toward and away from said spreader tool and mold, and means controlled by movement of the block in one direction for rotating said block to bring said working faces alternately into position adjacent the spreader tool and adjacent the mold.

7. A clay spreader machine including a rotating spreader tool, a mold, a pivot shaft, a frame mounted on said shaft, a block swiveled on said frame and having opposite working faces, power means for oscillating said pivot shaft, means on said pivot shaft controlling the power means to reverse the motion of the frame at the end of each stroke, and means on the frame swiveling the block through 180° as the frame moves in one direction to bring said working faces alternately into position adjacent the spreader tool and adjacent the mold.

8. A clay spreader machine including a vertical rotating spreader tool, a horizontal mold, a pivot shaft, a frame mounted on said shaft for swinging between said spreader tool and said mold, a block swiveled on said frame and having opposite working faces, power means swinging said frame, and cooperating means on the frame and pivot shaft automatically swiveling said block through 180° as it swings toward the mold to bring said working faces alternately into position adjacent the spreader tool and adjacent the mold.

9. A clay spreader machine including a rotating spreader tool, a mold, a shaft, a frame on said shaft, a block swiveled on said frame and having opposite working faces, piston and cylinder means oscillating said shaft to bring said working faces alternately into position adjacent the spreader tool and adjacent the mold, means on said shaft and frame for swiveling said block through 180° during movement of the frame in one direction, and valve means operated by said shaft to reverse said piston at each end of its stroke.

WILLIAM E. COPE.

REFERENCES CITED

The following references are of record in the file of this patent:

UNITED STATES PATENTS

| Number | Name | Date |
| --- | --- | --- |
| 1,669,682 | Straus | May 15, 1928 |
| 1,721,017 | Gurney et al. | July 16, 1929 |
| 2,041,788 | Sprunger | May 26, 1936 |
| 2,167,386 | Kinnard | July 25, 1939 |
| 2,335,123 | Kinnard | Nov. 23, 1943 |
| 2,417,255 | Kinnard | Mar. 11, 1947 |
| 2,437,109 | Maquat | Mar. 2, 1948 |